Aug. 3, 1926.
C. HERRMAN
TYPEWRITING MACHINE
Filed June 9, 1922
1,594,778
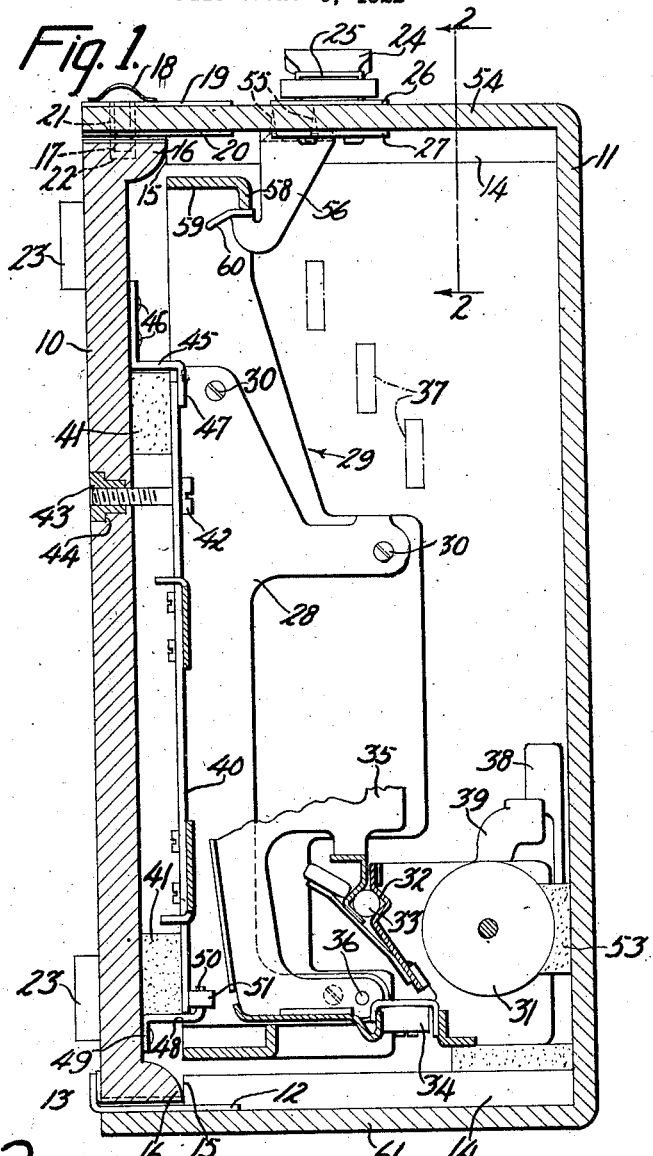
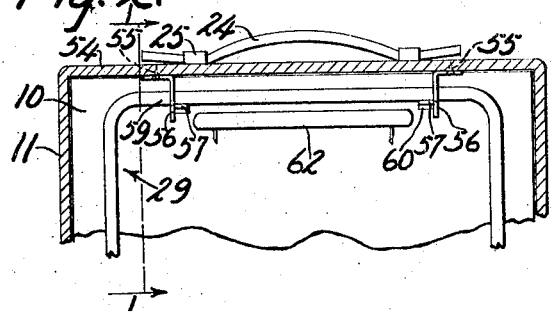
Inventor:
Charles Herrman
by D. C. Stickney
Attorney Patented Aug. 3, 1926.

1,594,778

UNITED STATES PATENT OFFICE.

CHARLES HERRMAN, OF NEW YORK, N. Y., ASSIGNOR TO UNDERWOOD TYPEWRITER COMPANY, OF NEW YORK, N. Y., A CORPORATION OF DELAWARE.

TYPEWRITING MACHINE.

Application filed June 9, 1922. Serial No. 566,983.

The present invention relates to casings and mountings for portable typewriting machines.

Heretofore, the casing in which a portable typewriting machine has been carried has been constructed in two parts; to wit, a base-piece to which the machine is attachable, and which may serve as a base-board in the operation of the machine, and a cover which may be set down over the base-piece and over the machine attached thereto. Suitable means for securing the base-piece to the cover, for transporting the machine, and a handle on the cover have also been provided. As casings have heretofore been constructed and held together, with the machine enclosed therein, the weight of the machine, in the transportation thereof, has fallen upon walls of the casing other than the wall having the handle by which the casing is carried.

An object of the present invention is the provision of means whereby, in the transportation of the machine by a handle on the casing, the weight of the machine may be caused to fall on the casing wall which has the handle, and preferably to fall immediately under the handle; so that the casing may be made of extremely light material without chance of distortion or springing of its joints and locks under the weight of the machine.

A feature of the invention is the provision of means whereby the machine may be engaged and directly supported by the cover (suspended from one wall of the latter), instead of, as heretofore, being supported indirectly by the cover through the intermediary of the base-piece to which the machine is attached.

A feature of the invention is its adaptability to a centering of the weight of the machine with respect to the casing, thereby avoiding bending and twisting strains on the casing and handle, and making the casing more durable and more convenient to carry.

A further feature of the invention is the provision of means for supporting the machine from the casing cover, which supporting means comes automatically to effective position upon placement of the cover on the base-piece.

Other features and advantages will hereinafter appear.

In the accompanying drawings:—

Figure 1 is a view in vertical cross-section through the casing and machine frame on the line 1—1 of Figure 2.

Figure 2 is a view in cross-section through the upper part of the casing and machine frame, taken on the line 2—2 of Figure 1.

Referring to the drawings, the casing is shown as comprising a base-piece 10 and a cover 11. For holding the base-piece to the cover, the latter, at its rear near each end thereof, has riveted to its inner wall a pair of guards 12 offset at 13 to overlap and hold the base-piece when the latter is in place. The base-piece with the machine thereon is inserted in the cover in tilted position to bring the rear edge of the base-piece over the offsets 13 of the guards 12; and thereupon the base-piece is swung into the cover in the Figure 1 position. In each corner of the cover is an elongated block 14, the lower ends 15 of which serve as stops for a peripheral flange 16 formed on the base-piece. At its forward end, the base-piece is held to the cover by a bolt 17 on a finger-piece 18 hinged to a plate 19 on the outer face of the cover. The plate 19 is riveted through the cover to a plate 20 on the inner face thereof. The bolt 17 passes through an aperture 21 in the cover and into a recess 22 in the base-piece, in which position it may be locked by a key, not shown.

The base-piece is provided with front and rear rubber feet 23, to serve as a sound-deadening support for the base-piece with the machine thereon when the latter is in use. The casing is also provided with a handle consisting of a strap 24 held by bands 25 on a plate 26, which is secured through the cover to a plate 27 on the inside of the latter.

The machine comprises an inner frame 28 and an outer or ornamental frame 29 secured to the inner frame by screws 30. The platen 31 is shown as mounted in a frame 32 supported by roller bearings 33 and 34 to have movement in letter-feed and return directions on a shift-frame 35 pivoted at 36 to the main frame 28. Type-keys are indicated at 37; a line-space lever at 38; and a carriage-return finger-piece at 39. The machine shown in the drawings is an Underwood standard portable typewriter.

An inwardly-turned lip or flange 40 is formed on each side of the frame 28. The machine is supported by these flanges on four blocks 41, to wit, two at the front and two at the rear, of compressed or hardened felt. For securing the machine to the base-piece, screws 42 pass through the flanges 40 and thread into nuts 43 set into the bottom of the base-piece. The nuts 43 are squared so as to be held against rotation when the screws 42 are tightened, and are shouldered at 44 to hold the same against movement through the base-piece against the pull of the screws when the latter are tightened. Guards 45 secured by screws 46 to the top of the base-piece have offsets 47, which, when the guards are set in place, overlap the front ends of the flanges 40 and assist in holding them fixedly to the base-piece. Guards 48 secured by screws 49 to the base-piece at the rear thereof have offsets 50 adapted to be at set into holes in lugs 51 formed on the frame 28 near the rear of the latter; and, when these guards are in place, they assist the screws 42 and the guards 45 in holding the machine against movement on the base-piece.

The shiftable parts of the machine are held against movement in the casing by blocks of felt. A felt block 53 positioned centrally of the casing cover serves as an abutment for the top of the platen, and thus holds the shift-frame, and parts carried thereby, in place when the machine is in the casing. The felt blocks 41 and 53 are glued or otherwise suitably secured to the casing members.

A purpose of the present invention being to support the base-piece and the attached machine from the end wall 54 of the casing cover, the latter has secured by screws 55, to the inner face thereof, a pair of hooks 56. These hooks are spaced well apart, so that the noses 57 thereof may engage a flange 58 on the front plate 59 of the outside frame 29 beyond the ends of the space-bar 62, see Figure 2. As shown in the drawings, the noses 57 of the hooks are offset laterally to provide considerable bearing for the machine frame; and are offset at 60 rearward with respect to the machine, so that, in swinging the base-piece of the machine into the casing cover, the flange 58 on the outer machine frame will find the hooks and be cammed by the latter into proper position on the hooks, as shown in Figure 1. When the front plate of the machine is in Figure 1 engagement with the hooks, the casing cover, except for the end wall 54 thereof, is relieved of the weight of the base-piece and attached machine.

It will be noted that the joints between the cover and the base-piece at the front and rear are sufficiently loose to permit the base-piece and attached machine to be carried by the hooks 56 free of the end wall 61 of the casing cover.

Variations may be resorted to within the scope of the invention, and portions of the improvements may be used without others.

Having thus described my invention, I claim:—

1. In combination, a casing for a typewriting machine, comprising, as one section thereof, a base-piece to which the typewriting machine is attachable, and means on the inner side of one wall of the casing adapted to engage the flanged front plate of the typewriting machine, for suspending the latter and base-piece therefrom.

2. In combination, a casing for a typewriting machine, comprising, as one section thereof, a base-piece to which the typewriting machine is attachable, and a supporting hook on the inner side wall of the casing, adapted to engage with the flanged front plate of the typewriting machine, for suspending the typewriting machine and base-piece therefrom.

3. In combination, a casing for a typewriting machine, comprising, as one section thereof, a base-piece to which the typewriting machine is attachable, and a pair of supporting hooks on the inner side wall of the casing, adapted to engage with the flanged front plate of the typewriting machine, for suspending the typewriting machine and base-piece therefrom.

4. In combination, a casing for a typewriting machine, comprising, as one section thereof, a base-piece to which the typewriting machine is attachable, and a pair of laterally offset supporting hooks on the inner side wall of the casing adapted to engage the flanged front plate of the typewriting machine, for suspending the typewriting machine and base-piece therefrom.

5. In combination, a casing for a typewriting machine, comprising, as one section thereof, a base-piece to which the machine is attachable, a handle to carry the machine, base-piece and casing on one wall of the casing, and means on said wall of the casing, under the handle co-operating with a flanged front plate of the machine, for supporting the machine therefrom.

6. In combination, a casing for a typewriting machine including a base-piece to which the machine is attachable and a cover with a handle on one end wall, said cover fitting loosely down over and outside of the base-piece and machine, a guard on the inner side of the wall of the cover, opposite the handle, behind which guard one edge of the base-piece may be set prior to swinging the cover down into place, a bolt for holding the opposite edge of the base-piece to the cover on the side carrying the handle, and a supporting hook depending from the wall of the cover at the front of the machine, adapted to engage with a flange on a front plate of the typewriting machine frame, for suspending the machine therefrom, said supporting hook having a nose extended at an incline to guide the front plate to its seat on the nose when the base-piece is swung into place in the cover.

7. In combination, a casing for a typewriting machine, said casing comprising a base-piece to which the machine is attachable, and a cover with a handle on one end wall, said cover fitting loosely down over and outside of the base-piece and machine, a guard and a stop on the inner side of the wall of the cover, opposite the handle, behind which guard and against said stop one edge of the base-piece may be set prior to swinging the cover down into place, a bolt on the wall carrying the handle for detachably holding the opposite edge of the base-piece to the cover, a supporting hook depending from the wall of the cover carrying the handle at the front of the machine, adapted to engage with a flanged plate of the framework of the typewriting machine, for suspending the machine therefrom, and means for guiding the flanged plate onto the hook as the base-piece is swung into the cover.

8. The combination with a typewriting machine including a main frame having a cross-bar at the front of the keyboard, of a case to enclose said machine, a handle at the front end of said case by which said case may be carried with the machine therein, and means from which the machine may hang to support it within the case while the latter is being carried by the handle, said means including a bracket secured to the inside of the case and adapted to engage with the front bar of the main frame of the typewriter.

9. The combination with a typewriting machine including a main frame having a cross-bar at the front of the keyboard, of a case to enclose said machine, a handle at the front end of said case by which said case may be carried with the machine therein, said case including a base-board and a cover, means from which the machine may hang to support it within the case while the latter is being carried by the handle, said means including a bracket secured to the inside of the case and engaging the front bar of the main frame, and means co-operative with said bracket to hold the machine against displacement relatively to the base-board while in transit.

CHARLES HERRMAN.